(12) United States Patent
Chung et al.

(10) Patent No.: US 6,403,662 B2
(45) Date of Patent: Jun. 11, 2002

(54) CONTINUOUS PROCESS FOR MANUFACTURING POLYOLEFIN FOAM BEADS

(75) Inventors: Moon Jo Chung; Nak Joong Kim, both of Seoul (KR)

(73) Assignee: Howtech Corporation Ltd., Seoul (KR)

( * ) Notice: Subject to any disclaimer, the term of this patent is extended or adjusted under 35 U.S.C. 154(b) by 0 days.

(21) Appl. No.: 09/761,565

(22) Filed: Jan. 16, 2001

(30) Foreign Application Priority Data

Feb. 8, 2000 (KR) .......................................... 2000-5745

(51) Int. Cl.$^7$ ................. C08J 9/16; C08J 9/18
(52) U.S. Cl. ................. 521/60; 521/56; 521/60; 521/142; 521/917
(58) Field of Search .................. 521/56, 60, 142, 521/58, 917; 264/53

(56) References Cited

U.S. PATENT DOCUMENTS

| | | |
|---|---|---|
| 4,379,859 A | 4/1983 | Hirosawa et al. |
| 4,889,671 A | 12/1989 | Akiyama et al. |
| 5,580,503 A | 12/1996 | Hall, III et al. |
| 5,753,157 A | 5/1998 | Hall, III et al. |
| 5,928,674 A | 7/1999 | Hall, III et al. |

*Primary Examiner*—Morton Foelak
(74) *Attorney, Agent, or Firm*—Christensen O'Connor Johnson Kindness PLLC

(57) ABSTRACT

A method for manufacturing polyolefin foam beads by a continuous process is disclosed by which the polyolefin foam beads can be produced with increased efficiency and productivity. The method comprises a step of impregnating foaming agent into polyolefin resin by mixing polyolefin resin particles, water and the foaming agent in a impregnation chamber under heat and pressure, followed by a step of storing the polyolefin resin containing the foaming agent in a storing chamber under heat and pressure. Thereafter, the resin particles are subjected to a foaming step by continuously or intermittently discharging the resin particles from the storing chamber to a low pressure expansion chamber by utilizing a discharging device, in the same time period when a next batch of polyolefin resin is added and mixed in the impregnation chamber after being supplied with the resin particles from a resin supply chamber.

2 Claims, 2 Drawing Sheets

Foaming Agent
Resin
201
205
202
204
203
205
Foam Beads

PRIOR ART

CONTINUOUS PROCESS FOR MANUFACTURING POLYOLEFIN FOAM BEADS

BACKGROUND OF THE INVENTION

1. Field of the Invention

The present invention relates to a method for manufacturing polyolefin foam beads, and more particularly to a method for manufacturing polyolefin foam beads continuously.

2. Description of the Related Art

Polymer foams made from polyurethane, polystyrene, or polyolefin are widely used as a shock absorbing material, heat insulating material, and packing material due to their flexibility, durability, light weight, and low thermal conductivity.

Conventionally, the polyolefin foam beads are commonly manufactured by vaporizing a foaming agent in a polyolefin resin through a batch process which is divided into a foaming agent impregnating step followed by a foaming step. Such method of manufacturing polyolefin foam beads is disclosed in U.S. Pat. No. 4,378,859. By referring to FIG. 2, the impregnating and the foaming steps will be described in more detail.

In the impregnating step, a foaming agent, dispersing agent, a resin particles, and water are added and mixed in a high-pressure impregnation chamber 201 under heat to facilitate the impregnation of foaming agent into the resin. Here, to prepare the resin particles for a subsequent foaming method, the impregnating step is carried out at a temperature between the softening point and the melting point of the resin.

In the foaming step, the resin particles containing the foaming agent are discharged from the high-pressure impregnation chamber 201 to a low-pressure foaming chamber 202. At the foaming chamber 202, the foaming agent impregnated in the resin particles is then vaporized to produce foam beads. Here, the excessive foaming agent in the upper space in the impregnation chamber is discharged along with the resin particles and water. The excessive foaming agent is recovered by a foaming agent recovery device 204 comprises of a cooler, a compressor and a layer separator. After being separated from water in the layer separator, the foaming agent is recycled into use and the water is retrieved to a water recovery chamber 203 to be put into use again.

However, the above conventional method has the following drawbacks.

First, the vapor pressure of the foaming agent at the operation temperature is high (10–30 kg/cm$^2$), and above a certain capacity the scale-up of high-pressure vessel is technically difficult, and the manufacturing cost of the pressure vessel increases drastically.

Second, in order to facilitate the mixing of the resin, foaming agent and water in the impregnation chamber, about 30% of the total volume of the impregnation chamber must be left as free gaseous space above the mixture. The amount of excessive foaming agent present as compressed vapor in the free space is about 30–50% of the total foaming agent supplied to the manufacturing method. In order to recover the excessive foaming agent from the expansion chamber, a large recovery device is required.

Third, a large expansion chamber having 20–50 times the volume of the impregnation chamber is required, because the volume of the resin increases by 20–50 times after the foaming step.

Forth, it is. necessary to heat the recovered water by 20–30° C. in order to use the water again, because the temperature of the water falls down after the foaming step.

Fifth, in order to discharge all the resin particles in the impregnation chamber, the amount of the resin which can be charged in the impregnation chamber is restricted, and beyond this amount, remained resin particles expand in the impregnation chamber during the foaming step to block the process.

Due to the problems and drawbacks described above, the conventional batch process reveals high capital cost and low production efficiency which yield high price of polyolefin foam to restrict its wide use despite of its desirable properties.

In this connection, it is to be noted that methods for manufacturing foam beads by continuous process are described in U.S. Pat. No. 5,580,503, U.S. Pat. No. 5,753,157, and U.S. Pat. No. 5,928,674. However, the above-mentioned continuous process have the problems that the resin particles block the moving part of pumps and check valves and the foaming agent is apt to be separated from water during the process due to the density difference.

SUMMARY OF THE INVENTION

In view of the foregoing, it is an object of the present invention to provide a continuous method for manufacturing polyolefin foam beads with markedly increased efficiency and enhanced productivity to lower the price of the polyolefin foams.

In order to achieve the above object, the present invention provides a method which comprises a impregnating step where resin particles, water and foaming agent are mixed in a impregnation chamber under heat and pressure, followed by a storing step where the resin particles containing the foaming agent are transferred to and stored in a storing chamber. Thereafter, the resin particles are subjected to a foaming step where the particles are discharged continuously or intermittently via a discharging device to produce the foam beads. Optionally, prior to the impregnating step, present method further comprises a supplying step of the resin particles, by which the resin particles are supplied to the impregnation chamber maintained at high pressure. Each step is processed sequentially and repeated continuously by separate chambers.

BRIEF DESCRIPTION OF THE DRAWINGS

The above objects and other advantages of the present invention will become more apparent by describing in detailed Examples thereof with reference to the attached drawings in which.

DETAILED DESCRIPTION OF THE INVENTION

The present invention will now be described in detail below.

Figure 1:
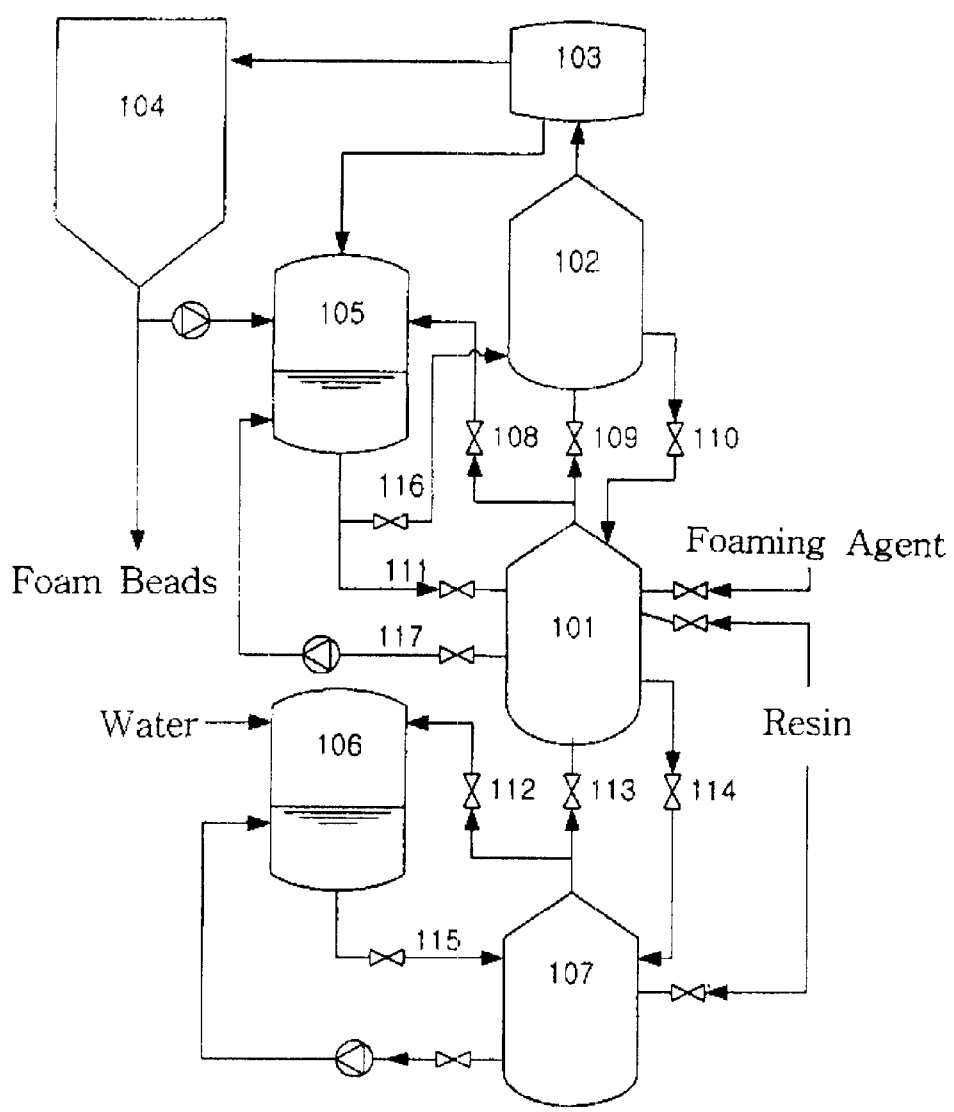
FIG. 1 is a schematic-view, illustrating a preferred embodiment of a manufacturing apparatus utilized to manufacture polyolefin foam beads according to the present invention.

A method utilizing a continuous method for manufacturing polyolefin foam beads according to the present invention will be described in reference to a preferred embodiment of equipment utilized by the method, which is shown by FIG. 1. To better understand the invention, the method of the present invention will be described in contrast to the conventional methods.

(a) Impregnating Step

In this step, foaming agent is impregnated in resin during the mixing of resin particles, water and the foaming agent in a high-pressure impregnation chamber 101 at the temperature between softening point and melting point of the resin, which is similar to the conventional methods.

Here, when a supplying step (d) precedes the impregnating step (a), the resin particles are supplied to a resin supply chamber 107 which is connected to the impregnation chamber 101, and the foaming agent is directly added into the impregnation chamber 101. The supplying step (d) will be described in detail later.

In contrast to the conventional method, where the resin particles containing the foaming agent are discharged to a expansion chamber 202 together with water and excessive foaming agent via a discharging outlet positioned at a lower portion of the impregnation chamber 201, the resin processed by the impregnating step of the present invention is transferred to a storing chamber 102 by its buoyancy via a discharging outlet preferably positioned at an upper portion of the impregnation chamber 101.

For polyolefin resin, polyethylene, polypropylene, or various types of copolymers of ethylene and propylene such as random copolymer, block copolymer, or graft copolymer can be used. Additionally, copolymers comprised of ethylene or propylene and other olefin monomers such as ethylene-propylene-1-butene copolymer, ethylene-propylene-butadiene copolymer can also be used, in addition to copolymers comprised of olefin monomers and non-olefin monomers such as vinyl acetate, styrene.

For foaming agent, CFC-11, CFC-12, propane, butane, pentane, carbon dioxide or any other substance which has the capability of forming gaseous bubbles inside the resin can be used. However, it is preferable to use butane or pentane. Montreal Protocol limits the use of CFCs, and propane has high vapor pressure. Carbon dioxide is safe in respect to fire and explosion; however, it needs very high operation pressure.

(b) Storing Step

Here, the resin particles containing the foaming agent via step (a) are transferred to and stored in a storing chamber 102. The present step is not found in the conventional methods.

In this step, the excessive foaming agent that exists as compressed vapor phase in the free space of the impregnation chamber 101 is recovered to the solution chamber 105 by introducing water dissolved with the foaming agent (foaming agent solution) to the impregnation chamber 101 to replace the vapor with the foaming agent solution. A pump can be utilized to introduce the solution into the impregnation chamber 101, but, as shown by FIG. 1, by positioning a solution chamber 105 higher than the impregnation chamber 101 and connecting the upper and lower portions of the solution chamber 105 with the respective upper and lower portions of the impregnation chamber 101 via a gas transfer pipe 108 and a liquid transfer pipe 111, respectively, the foaming agent solution in the solution chamber 105 can be introduced to the impregnation chamber 101 by gravity. To maintain or not to disturb the concentration of the foaming agent impregnated in the resin particles, it is preferable that the solution in the solution chamber 105 should be saturated with the foaming agent at the same temperature with the adsorption chamber.

Once the vapor in the free space of the impregnation chamber 101 is replaced with the foaming agent solution from the solution chamber 105, the gas transfer pipe 108 and liquid transfer pipe 111 are closed, and a resin transfer pipe 109 connecting the upper portion of the impregnation chamber 101 and the lower portion of the storing chamber 102 is opened to allow the resin particles to transfer to the storing chamber 102 by their buoyancy. The storing chamber 102 is also filled with water saturated with the foaming agent and maintained at the same temperature and pressure to the impregnation chamber 101. To promote the transfer of the resin, the solution in the storing chamber 102 is allowed to drain into the impregnation chamber 101 via a pressure-equalizing pipe 110.

Once all the resin particles are transferred to the storing chamber 102, the resin transfer pipe 109 and pressure equalizing pipes 110 are closed. Immediately after, the next batch of resin and foaming agent is added in the impregnation chamber 101 to repeat the impregnating step.

(c) Foaming Step

The resin in the storing chamber 102 is discharged to an expansion chamber 104 continuously or intermittently via a discharging device 103. This step is also unique and not found in the conventional method.

The resin particles move from the storing chamber 102 by their buoyancy to the discharging device 103 which is connected to the upper part of the storing chamber 102. For the discharging device 103, various types of device can be utilized which has the capability of maintaining constant pressure in the storing chamber 102 during the discharge of the resin particles and water mixture. For continuous discharge of the mixture, an orifice-type device can be utilized, and for discharge of constant amount of the mixture repetitively, a batch-type discharge device can be utilized. During the discharging process, the volume of the discharged mixture must be complemented continuously by the equal volume of the foaming agent solution to maintain the pressure of the storing chamber 102 constant. That can be accomplished by transferring the foaming agent solution in the solution chamber 105 via a liquid transfer pipe 116, which connects the lower portion of the solution chamber 105 to the storing chamber 102, through which the solution is transferred by a vapor pressure generated from the foaming agent in the solution chamber 105. The foaming agent solution, which is discharged with the resin, is recovered from the expansion chamber 104 after the foaming method, or it can be recovered by a specially designed discharging device, which separates the solution from the resin prior to the foaming method.

According to the present invention, more resin can be charged in each chamber compared to the conventional impregnation chamber without the above-mentioned blocking problem, because the resin in each chamber is transferred to the next chamber continuously and gradually under constant pressure. Therefore the efficiency of the chambers increase remarkably (2–3 time) than the conventional method.

The volume of the expansion chamber can be substantially decreased compared to the conventional method, since the resin particles are discharged gradually via the discharging device instead of abrupt and rapid discharge in the conventional method. Since the discharge proceeds gradually, the expansion chamber can be operated under the atmospheric pressure, which reduces the manufacturing cost for the high pressure vessels.

The capacity of the foaming agent recovery device comprising a cooler and a compressor can also be reduced, because all the excessive foaming agent is recovered in the storing step before expansion, in contrast to the conventional methods where the excessive foaming agent is recovered from the expansion chamber after the expansion.

(d) Supplying Step

This step is optionally implemented to further increase the productivity of polyolefin foam beads. Here, the resin is supplied to the impregnation chamber while maintaining the high pressure in the impregnation chamber.

First, the resin is supplied to a resin supply chamber 107 installed below the impregnation chamber 101, and all the gaseous space in the resin supply chamber 107 is replaced with water from a water chamber 106. Specifically, by connecting the lower portion of the water. chamber 106 and the resin supply chamber 107 with a liquid transfer pipe 115 and connecting the both upper portions of the water chamber 106 and the resin supply chamber 107 with a gas transfer pipe 112, the water in the water chamber 106 is transferred to the resin supply chamber 107 by gravity via the liquid transfer pipe 115, while the gas in the resin supply chamber 107 is transferred to the water chamber 106 via the gas transfer pipe 112 or vented to atmosphere. After the completion of impregnating step and the resin particles in the impregnation chamber 101 are transferred to the storing chamber 102, the resin particles in the resin supply chamber 107 are transferred to the impregnation chamber 101. In order to supply the resin particles to the high pressure impregnation chamber, the pipe 112 and 115 are closed and a pressure equalizing pipe 114 and resin transfer pipe 113 are opened, then the resin particles are transferred to the impregnation chamber 101 by their buoyancy. Once the resin transfer is completed, the pressure equalizing pipe 114 and the resin transfer pipe 113 are closed, and while opening the gas transfer pipe 108, the water in the impregnation chamber 101 is transferred to the solution chamber 105 via a liquid transfer pipe 117 by pumping, until gaseous free space becomes 20–40% of the volume of the impregnation chamber. Thereafter, a predetermined amount of the foaming agent is added to the impregnation chamber 101, and the impregnating step (a) is repeated again. Here, the method of transferring the water from the impregnation chamber 101 to the solution chamber 105 can be carried out prior to transferring the resin from the resin supply chamber 107. While the impregnating step (a) is being carried out in the impregnation chamber 101, the resin supply chamber 107 is depressurized to atmospheric pressure and the resin for next batch is charged. Optionally, the resin particles can be preheated in the supplying step.

As a result, the method provided by the present invention increases the productivity not only by increasing the efficiency of the equipment but also decreasing the processing time.

In the conventional methods, all materials including resin particles, water, and the foaming agent are heated in the impregnation chamber and discharged to the expansion chamber, and after the completion of the foaming process, the resin particles, foaming agent and water are supplied again into the impregnation chamber to repeat another batch. The time required for each batch ranges between 6 to 8 hours, which is contributed by the time for supplying water and resin particles to impregnation chamber, and for heating the mixture of resin particles, water and foaming agent to the predetermined temperature, and for discharging the mixture to the expansion chamber, and for waiting for the system pressure to be reduced down for the supply of next batch.

In contrast, the present invention divides each time consuming step into each separate chamber and each step is carried out simultaneously and repetitively in each chamber. Therefore, the time consumed in each chamber reduced down to less than 2 hours and the productivity can be increased.

EXAMPLES

The following Examples are provided to further illustrate the invention and are not intended to limit the scope of the present invention.

Comparative Example 1

Figure 2:
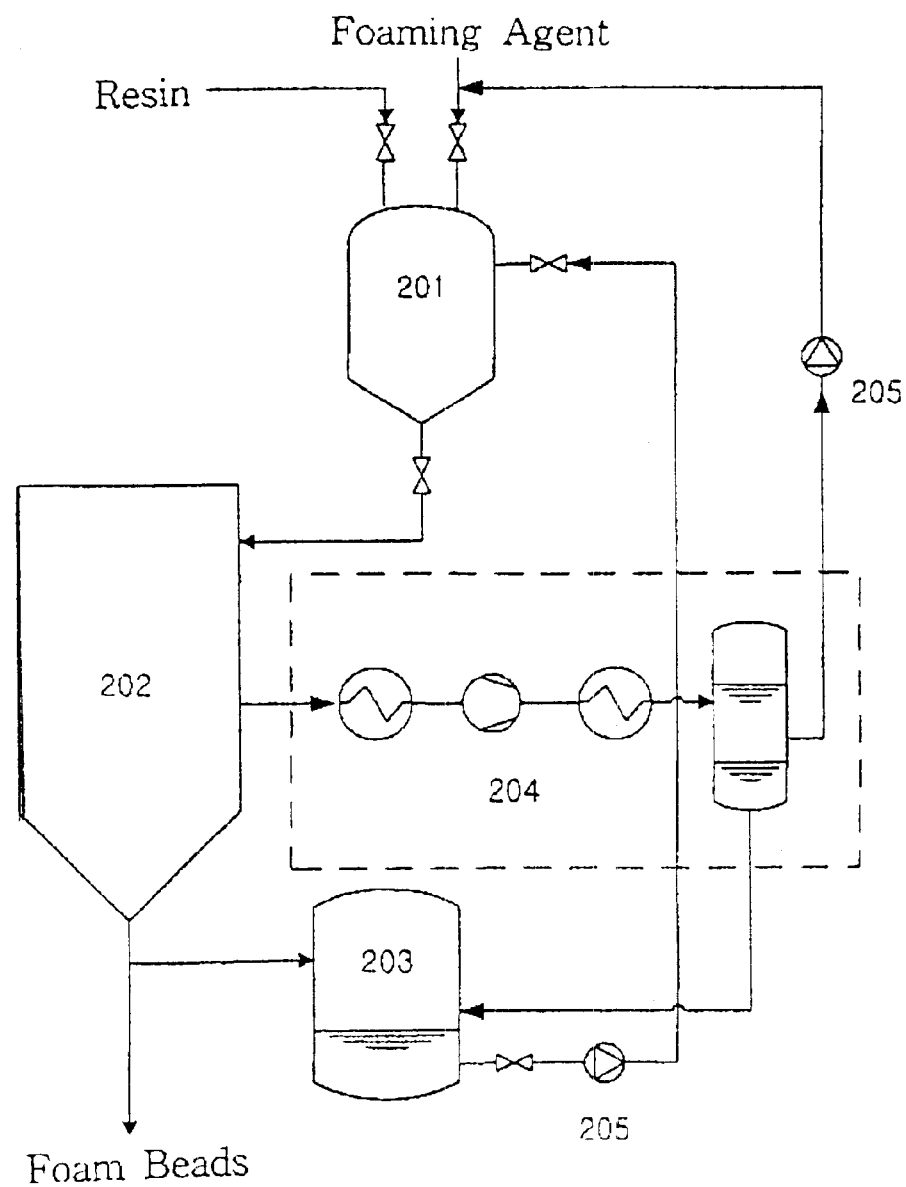
FIG. 2 is a schematic-view, illustrating a conventional manufacturing apparatus utilized to manufacture polyolefin foam beads.

By utilizing the equipment shown in FIG. 2, polypropylene foam beads were manufactured by a conventional batch process method. The volume of the impregnation chamber 201 and the expansion chamber 202 was 1 liter and 40 liter, respectively. Polypropylene resin, having a particle diameter of 3 mm and a melting point of 164° C. was used, and butane was used as a foaming agent.

50 g of the resin, 560 g of water, and 50 g of butane were added and mixed in the impregnation chamber 201 at 200 rpm and heated to 125° C. The impregnation chamber 201 was maintained at 125° C. for 30 minutes and the pressure was 27 kg/cm$^2$. Then, all materials in the impregnation chamber 201 were discharged to the expansion chamber 202 via a ball valve at the lower portion of the impregnation chamber 201, and polypropylene foam beads having an average expansion ratio of 30 were obtained. After discharge, the pressure and temperature in the expansion chamber 202 was 2 kg/cm$^2$ and 60° C., respectively. Thereafter, when the pressure in the expansion chamber 202 has reduced to atmospheric pressure, the discharge ball valve was closed and the same amount of the resin, water and butane were added into the impregnation chamber to repeat the cycle. It took 6 hour for each batch which is equivalent to the production rate of 8.3 g/h of foam beads.

Example 1

By utilizing the equipment shown in FIG. 1, polypropylene foam beads were manufactured continuously by a method according to the present invention. The volume of the impregnation chamber 101, storing chamber 102, solution chamber 105, expansion chamber 104, resin supply chamber 107, and water chamber 106 were all respectively 1 liter (although the volume of the impregnation chamber was same as in Comparative Example 1, the volume of the expansion chamber was 1/40 of Comparative Example 1). To easily discharge the resin, the upper parts of the impregnation chamber 101, storing chamber 102, and resin supply chamber 107 were manufactured as conical shape.

(a) Impregnating Step 200 g of polypropylene resin particles having a diameter of 3 mm, 300 g of water, and 130 g of butane (as a foaming agent) were added and mixed in the impregnation chamber 101 at 200 rpm and heated to 125° C. The temperature and pressure in the impregnation chamber 201 was maintained at 125° C. and 27 kg/cm$^2$, respectively, for 30 minutes, and resin particles containing butane were obtained. In the meantime, 600 g of water and 100 g of butane were added and mixed in the solution chamber 105 to obtain a solution of water saturated with butane, and the saturated solution was maintained at a same temperature (125° C.) to the impregnation chamber 101. The storing chamber 102 was also filled with the saturated solution, which was also maintained at 125° C.

(b) Storing Step

Once the impregnating step was completed, the gas and liquid transfer pipes 108 and 111 were opened to transfer the saturated solution from the solution chamber 105 to the impregnation chamber 101 by gravity to replace the gaseous space in the upper portion of the impregnation chamber 101. After closing the gas and liquid transfer pipes 108 and 111, the resin transfer pipe 109 and pressure equalizing pipes 110 were opened to allow the resin particles to transfer to the storing chamber 102 by the buoyancy. When all the resin particles are transferred to the storing chamber 102, the resin transfer pipe 109 and pressure equalizing pipes 110 were then closed.

(c) Foaming Step

By utilizing the discharging device 103, which has the capability of discharging 2 cc of the mixture of the resin particle and water at one operation, the resin particles were discharged to the low-pressure expansion chamber while the saturated solution from the solution chamber 105 was continuously supplied to the storing chamber 102 via the liquid transfer pipe 116 to maintain the pressure in the storing chamber 102.

During the foaming process, the impregnating step and storing step were repetitively carried out as described below to obtain polypropylene foam beads having an average expansion ratio of about 30.

For the next batch of the resin, the water dissolved with the butane in the impregnation chamber 101 was transferred to the solution chamber 105 via the liquid transfer pipe 117, and 200 g of resin was added into the impregnation chamber 101 after the pressure of the impregnation chamber was reduced to atmospheric pressure. Thereafter, the air in the impregnation chamber 101 was evacuated by a vacuum pump, followed by adding 130 g of the butane and 300 g of saturated solution from the solution chamber 105 into the impregnation chamber 101. The temperature and pressure in the impregnation chamber 101 were maintained at 125° C. and 27 kg/cm$^2$ for 30 minutes to carry out the impregnating step (a). After the completion of the impregnating step (a), the resin particles containing the foaming agent were transferred to the storing chamber 102 by the method described by the storing step (b). It took 4 hours for the completion of impregnating step (a) and the discharging rate was adjusted in order for the foaming step(c) could be completed in 4 hours. The production rate of the continuous method of the present invention was equivalent to 50 g/h of foam beads. The average expansion ratio of the produced foam beads was 30.

In contrast to the conventional method in Comparative Example 1 (production rate 8.3 g/h), the production rate of Example 1 provided by the present invention was 6 times higher than the conventional method.

Example 2

By the same method described in Example 1, the impregnating step (a), the storing step (b), and the foaming step (c) were sequentially carried out for a first batch of the polypropylene resin. For a second batch of the resin, a supplying step (d) was implemented. The second batch of the resin was supplied to the impregnation chamber 101 from the resin supply chamber 107 maintaining the high pressure in the impregnation chamber 101. The supplying step is described in detail below.

(d) Supplying Step

The same polypropylene resin was added in an amount of 200 g to the resin supply chamber 107, and the water maintained at 80° C. in the water chamber 106 was transferred to the resin supply chamber 107 via the liquid transfer pipe 115, while the air in the upper space in the resin supply chamber 107 was discharged to outside. After the completion of transferring the preceding batch of resin in the impregnation chamber 101 to the storing chamber 102, the resin in the resin supply chamber 107 which was maintained at 80° C. was transferred to the impregnation chamber 101 by buoyancy with opening the resin transfer pipe 113 and the equalizing pipe 114.

Once all the resin was transferred to the impregnation chamber 101, 500 g of water dissolved with butane (foaming agent) in the impregnation chamber 101 was transferred to the solution chamber 105, and the impregnating step (a) was repeated after adding 130 g of butane in the impregnation chamber 101 as shown in Example 1.

The subsequent batches of polypropylene resin was added to the resin supply chamber 107 by the method just described above and respectively processed by the supplying step (d), the impregnating step (a), the storing step (b), and the foaming step(c) to obtain polypropylene foam beads having an average expansion ratio of about 30. The time consumed by the impregnating step for each batch was about 2 hours, and the production rate was equivalent to 10 g/h of polypropylene foam beads.

In contrast to the conventional method in Comparative Example 1 (production rate 8.3 g/h), the production rate of Example 2 provided by the present invention was 12 times is higher than the conventional method.

Example 3

By utilizing the same equipment used in Example 2, polyethylene foam beads was manufactured from polyethylene resin particles having a diameter of 2 mm and a melting point of 132° C., and propane as a foaming agent.

For the first batch, 200 g of polyethylene resin was added into the resin supply chamber 107, and the air in the resin supply chamber 107 was replaced by water maintained at 70° C. in the water chamber 106. Then, the resin was transferred to the impregnation chamber 101 having 300 g of water saturated with propane at 90° C. Thereafter, 110 g of propane were added into the impregnation chamber 101, and the mixture was heated to 95° C. and maintained for 30 minutes at that temperature. The pressure became 41 kg/cm$^2$. After the impregnating step, the resin particles containing the foaming agent were then processed by the storing step (b) and subsequently by the foaming step (c) to obtain polyethylene foam beads. The temperature and pressure in the storing chamber 102 and solution chambers 105 were maintained as the same as the impregnation chamber 101. While the first batch was at the foaming step (c), a second batch of the resin was added into the resin supply chamber 107. And it was then sequentially and continuously processed by the supplying step (d), the impregnating step (a), the storing step (b), and the foaming step (c) to obtain polyethylene foam beads having an average expansion ratio of about 30. Here, the impregnating step consumed 2 hours for each batch, and the production rate was equivalent to 10 g/h of polyethylene foam beads.

Example 4

Ethylene-propylene copolymer resin having a diameter of 2 mm and a melting point of 147° C., pentane (foaming agent), and the same equipment used in Example 2 were utilized to manufacture ethylene-propylene copolymer foam beads.

For each batch, 200 g of the resin particles were added into the resin supply chamber 107, and 145 g of pentane was added into the impregnation chamber 101. The temperature of the water chamber 106 was maintained at 80° C., and the impregnation chamber 101 was maintained at 115° C. and 10 kg/cm², and the temperature and pressure in the storing chamber 102 and solution chamber 105 were maintained as the same as the impregnation chamber 101. The impregnating step consumed about 2 hours for each batch, and the production rate was equivalent to 10 g/h of foam beads. The average expansion ratio was about 30.

Example 5

Ethylene-propylene-butadiene copolymer resin having a diameter of 2 mm and a melting point of 135° C., butane (foaming agent), and the same equipment used in Example 2 were used to manufacture ethylene-propylene-butadiene copolymer foam beads.

For each batch, 200 g of the resin particles were added into the resin supply chamber 107, and 130 g of butane was added into the impregnation chamber 101. The temperature of the water chamber 106 was maintained at 80° C., and the impregnation chamber 101 was maintained at 110° C., and the temperature and pressure in the storing chamber 102 and solution chambers 105 was maintained the same as the impregnation chamber 101. The impregnating step consumed about 2 hours for each batch, and the production rate was equivalent to 100 g/h of foam beads. The average expansion ratio was about 30.

Example 6

Ethylene-propylene-1-butene copolymer resin having a diameter of 2 mm and a melting point of 125° C., pentane (foaming agent), and the same equipment used in Example 2 were used to manufacture ethylene-propylene-butadiene copolymer foam beads.

For each batch, 200 g of the resin was added into the resin supply chamber 107, and 145 g of pentane was added into the impregnation chamber 101. The temperature of the water chamber 106 was maintained at 80° C., and the impregnation chamber 101 was maintained at 110° C. during the impregnating step (a). The temperature and pressure in the storing chamber 102 and solution chamber 105 were maintained as the same as the impregnation chamber 101. The impregnating step consumed about 2 hours for each batch, and the production rate was equivalent to 100 g/h of foam beads. The average expansion ratio was about 30.

Example 7

Ethylene-propylene copolymer resin having a diameter of 2 mm and a melting point of 132° C., carbon dioxide (foaming agent), and the same equipment used in Example 2 were used to manufacture ethylene-propylene copolymer foam beads.

For each batch, 200 g of the resin were added into the resin supply chamber 107, and carbon dioxide was supplied to the impregnation chamber 101 until its internal pressure reached 40 kg/cm². The temperature of the chamber 106 was maintained at 80° C., and the impregnation chamber 101 was maintained at 130° C. and 40 kg/cm² during the impregnating step (a). The temperature and pressure in the storing chamber 102 and solution chamber 105 were maintained the same as the impregnation chamber 101. The impregnating step consumed about 2 hours for each batch, and the production rate was equivalent to 100 g/h of foam beads. The average expansion ratio was about 15.

As described by the above Examples, the same polyolefin foam beads manufactured by the conventional methods were able to be obtained continuously by employing the method provided by the present invention, with increased productivity of about 12 times over the conventional methods when the supplying step (d) was implemented, and about 6 times when the method of the present invention was carried out without the supplying step (d).

While the present invention has been particularly shown and described with reference to particular Examples thereof, it will be understood by those skilled in the art that various changes in form and details may be effected therein without departing from the spirit and scope of the invention as defined by the appended claims.

What is claimed is:

1. A method utilizing a continuous process for manufacturing polyolefin foam beads comprising the steps of:

impregnating a foaming agent into a polyolefin resin by mixing the polyolefin resin particles, water and the foaming agent in a impregnation chamber at the temperature between softening point and melting point of the resin;

storing the polyolefin resin particles impregnated with the foaming agent in water dissolved with the foaming agent in a storing chamber at the temperature between softening point and melting point of the resin; and foaming the polyolefin resin by continuously or intermittently discharging the resin particles from the high pressure storing chamber to a low pressure expansion chamber by utilizing a discharging device, in the same time period when the next batch of polyolefin resin is added and mixed in the impregnation chamber.

2. A method utilizing a continuous method for manufacturing polyolefin foam beads as claimed in claim 1, wherein prior to the impregnating step, the method further comprises the step of supplying the polyolefin resin particles to the impregnation chamber maintaining the pressure of the impregnation chamber by adding the polyolefin resin particles and water dissolved with or without the foaming agent to a resin supply chamber, and transfer the resin particles to impregnation chamber after equalizing the pressure between the impregnation chamber and the resin supply chamber, whereby each batch of the polyolefin resin is processed sequentially and continuously by the supplying step, the impregnating step, the storing step, and the foaming step.

* * * * *

UNITED STATES PATENT AND TRADEMARK OFFICE
CERTIFICATE OF CORRECTION

PATENT NO.     : 6,403,662 B2                                         Page 1 of 1
DATED          : June 11, 2002
INVENTOR(S)    : M.J. Chung et al.

It is certified that error appears in the above-identified patent and that said Letters Patent is hereby corrected as shown below:

<u>Title page,</u>
Item [56], References Cited, FOREIGN PATENT DOCUMENTS, insert in appropriate order:
-- FOREIGN PATENT DOCUMENTS
EP      82105649.6     1/1983
JP      57186271       5/1984 --
Item [30], Foreign Application Priority Data, "2000-5745" should read
-- 10-2000-5745 --

<u>Column 10,</u>
Line 28, "the temperature" should read -- a temperature --
Line 33, "the temperature" should read -- a temperature --
Line 46, "chamber maintaining" should read -- chamber and maintaining --
Line 49, "and transfer" should read -- and transferring --

Signed and Sealed this

Twenty-seventh Day of May, 2003

JAMES E. ROGAN
*Director of the United States Patent and Trademark Office*